United States Patent
Bakran et al.

(10) Patent No.: US 6,725,663 B2
(45) Date of Patent: Apr. 27, 2004

(54) POWER PLANT AND ASSOCIATED STARTING METHOD

(75) Inventors: Velimir Bakran, Rimbach (DE); Peter Keller-Sornig, Baden (CH); Ilja Tuschy, Heidelberg (DE)

(73) Assignee: Alstom Technology LTD, Baden (CH)

( * ) Notice: Subject to any disclaimer, the term of this patent is extended or adjusted under 35 U.S.C. 154(b) by 0 days.

(21) Appl. No.: 10/216,900

(22) Filed: Aug. 13, 2002

(65) Prior Publication Data

US 2003/0033807 A1 Feb. 20, 2003

Related U.S. Application Data

(60) Provisional application No. 60/312,779, filed on Aug. 17, 2001.

(51) Int. Cl.⁷ .............................................. F01K 7/34
(52) U.S. Cl. ........................... 60/653; 60/676; 60/39.01
(58) Field of Search ...................... 60/653, 676, 39.01, 60/39.07

(56) References Cited

U.S. PATENT DOCUMENTS

| | | | | |
|---|---|---|---|---|
| 5,083,425 A | * | 1/1992 | Hendriks et al. | ........ 60/39.183 |
| 5,319,925 A | * | 6/1994 | Hendriks et al. | ........ 60/39.183 |
| 5,586,429 A | * | 12/1996 | Kesseli et al. | ................ 60/785 |
| 6,202,402 B1 | * | 3/2001 | Sattelmayer | ............. 60/39.511 |
| 6,256,978 B1 | * | 7/2001 | Gericke et al. | .......... 60/39.182 |

* cited by examiner

Primary Examiner—Hoang Nguyen
(74) Attorney, Agent, or Firm—Burns, Doane, Swecker & Mathis, L.L.P.

(57) ABSTRACT

The invention relates to a power plant (1),
  with at least one turbo group (2) comprising at least one turbine (3) and at least one main burner (5) which is arranged upstream of the turbine (3),
  with at least one recuperator (11) which is arranged, on the one hand, in a first flow path (15) leading gas toward the turbo group (2) and, on the other hand, in a second flow path (12) leading the gas away from the turbo group (2),
  with at least one auxiliary burner (19) which is arranged outside the second flow path (12) and which is connected on the outlet side, at or upstream of the recuperator (11), to the second flow path (12).

11 Claims, 1 Drawing Sheet

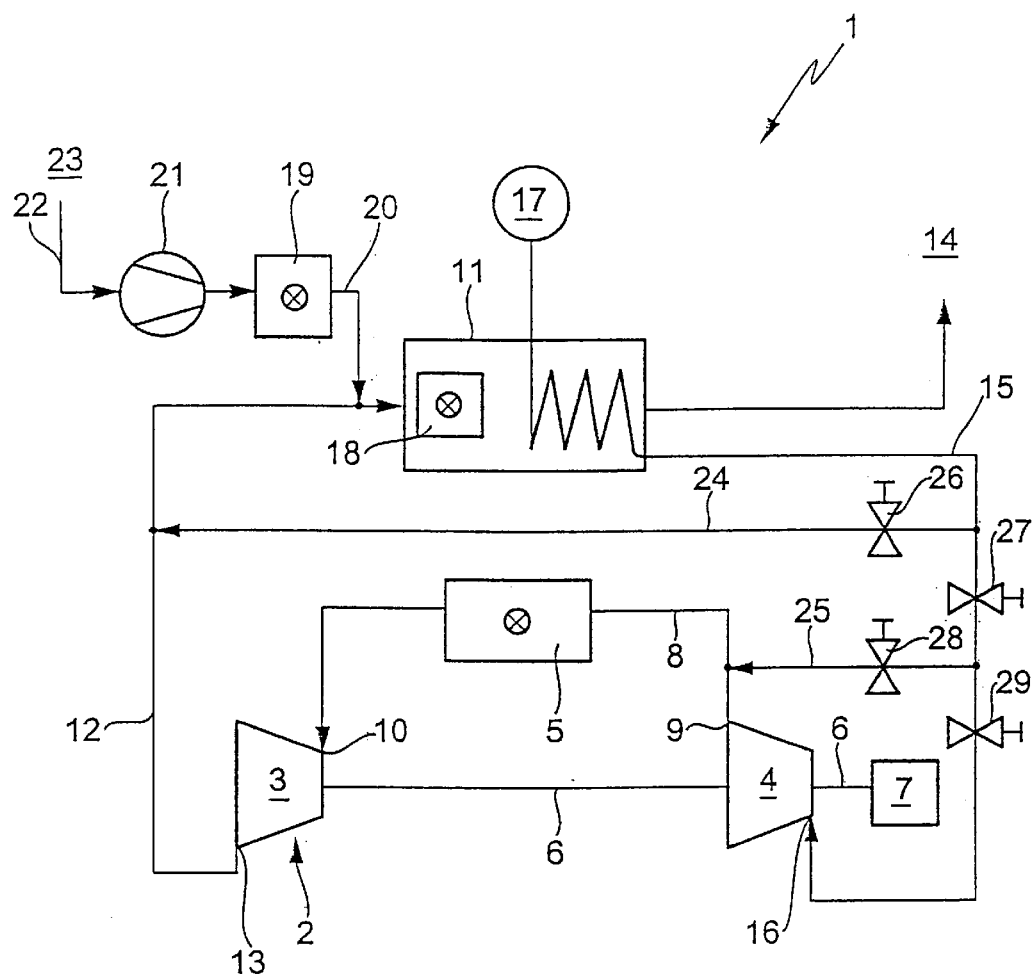

POWER PLANT AND ASSOCIATED STARTING METHOD

This application claims the benefit of Provisional Application No. 60/312,779, filed Aug. 17, 2001.

TECHNICAL FIELD

The invention relates to a power plant with at least one turbo group and with a recuperator. The invention relates, moreover, to a method for starting a power plant of this type.

PRIOR ART

A power plant of the type initially mentioned conventionally comprises a turbo group with at least one turbine and with at least one main burner which is arranged upstream of the turbine and, during operation, generates hot gases which act upon the turbine. A generator for current generation may be drive-connected to this turbo group. In normal operation, with the aid of a recuperator which is arranged, on the one hand, in a first flow path leading gas toward the turbo group and, on the other hand, in a second flow path leading gas away from the turbo group, heat is extracted from the gases emerging from the turbo group, in order thereby to preheat the gases delivered to the turbo group. To increase efficiency, an additional burner, by means of which the temperature level of the preheated gases delivered to the turbo group can be additionally increased, may be arranged in the recuperator in the second flow path of the gases emerging from the turbo group.

The power plant can be shut down during times of low current demand, for example at night or weekends, or for maintenance purposes. As a result, in particular, the turbo group and the recuperator cool down to a greater or lesser extent. In this case, as a rule, the recuperator cools down more quickly than the components of the turbo group. So that the power plant or the respective turbo group can develop its full power output as rapidly as possible, it is expedient for the recuperator to be preheated. In a power plant which is designed as a gas storage power plant and the turbo group of which is equipped with an additional turbine arranged upstream of the main burner, thermal stresses in the components of the additional turbine, for example in guide vanes and moving blades, can thereby be reduced. By virtue of the reduction in thermal stresses, the useful life of individual components of the power plant can thus also be increased.

To preheat the recuperator, it is basically possible for the recuperator to be preheated by putting into operation the additional burner arranged in the recuperator. However, this may lead in the recuperator, in particular near the additional burner, locally to hot zones or spots, the temperature of which is above a selfignition temperature of a fuel/oxidizer mixture which is delivered to the main burner for combustion in order to start the turbo group. Hot zones or spots of this kind are a disadvantage when an attempt to ignite the main burner fails, since the combustible fuel/oxidizer mixture then comes into contact with these hot zones or spots and may ignite there in an undesirable way.

PRESENTATION OF THE INVENTION

The invention is intended to remedy this. The invention, as characterized in the claims, is concerned with the problem of finding for a power plant of the type initially mentioned a way which makes it possible to preheat the recuperator, without at the same time giving rise to the risk of critical local hot spots in the recuperator.

This problem is solved by means of the subjects of the independent claims. Advantageous refinements are presented in the dependent claims.

The present invention is based on the general idea of preheating the recuperator with the aid of an auxiliary burner which is arranged outside the second flow path, that is to say, in particular, outside the recuperator. This measure makes it possible to ensure in a particularly simple way that the critical selfignition temperature of the fuel/oxidizer mixture is not reached at any point in the second flow path and therefore in the recuperator. The invention thus makes it possible, should an attempt to ignite the main burner fail, to reduce or to avoid the risk of an undesirable selfignition of the fuel/oxidizer mixture in the system as a whole.

Since the auxiliary burner used for preheating the recuperator is arranged outside the second flow path, the temperature in the second flow path or in the recuperator cannot at any point be higher than the temperature which the gas generated by the auxiliary burner and fed into the second flow path possesses, this temperature being relatively easily controllable. In particular, in the case of this externally arranged auxiliary burner, it is unimportant whether the critical selfignition temperature is exceeded or not locally in it, since the external auxiliary burner cannot come into contact with the explosive fuel/oxidizer mixture even in the event of a misignition of the main burner. It may even be expedient first, with the aid of the additional burner, to generate hot gases, the temperature of which is above the critical selfignition temperature, appropriate quantities of cold gases being admixed before the feed into the second flow path, in order to lower the temperature of the gas mixture ultimately delivered to the second flow path below the critical selfignition temperature. This admixing of cold gas preferably already takes place within the auxiliary burner, for example by means of a corresponding secondary gas supply.

The power plant proposed according to the invention and the starting method according to the invention are particularly suitable for use in what is known as a "compressed-air energy-storage system", CAES system in brief. The basic idea of a CAES system is seen in transferring excess energy generated by permanently operated power stations during the basic-load times into the peak-load times. This is achieved in that, with the aid of the excess energy, air or another gas is pumped under a relatively high pressure into a store, from which the air or the gas can be extracted, as required, for current generation. This means that the energy is kept retrievably in stock in the form of potential energy. Used-up coalmines, limestone quarries or salt mines, for example, serve as stores.

Further important features and advantages of the invention may be gathered from the subclaims, from the drawing and from the accompanying FIGURE description with reference to the drawing.

BRIEF DESCRIPTION OF THE DRAWING

A preferred embodiment of the invention is illustrated in the drawing and is explained in more detail in the following description.

The single FIGURE shows, in the form of a circuit diagram, a basic illustration of a power plant according to the invention.

EMBODIMENTS OF THE INVENTION

According to the FIGURE, a power plant 1 according to the invention has at least one turbo group 2 which comprises a turbine 3, an additional turbine 4 and a main burner 5. The power plant 1 illustrated is in this case designed as a gas storage power plant which has a gas store 17, a first flow path 15 being provided, which leads the gas stored in the gas store 17 to the turbo group 2. The power plant 1 shown thus forms an integral part of a CAES system. The CAES system conventionally operates with air as storage medium.

The turbine 3 follows the main burner 5 and is designed as a conventional gas turbine. In contrast to this, the additional turbine 4 precedes the main burner 5 and is based on steam turbine technology. Insofar as the additional turbine 4 is acted upon by air, it may also be designated as an air turbine. The turbine 3 is drive-connected to the additional turbine 4 via a common drive shaft 6. Furthermore, the turbine 3 and the additional turbine 4 are likewise drive-connected by the drive shaft 6 to a generator 7 which serves for current generation. The main burner 5 is arranged in an internal flow path 8 to the turbo group 2, said flow path connecting an outlet 9 of the additional turbine 4 to an inlet 10 of the turbine 3. The supply of fuel to the main burner 5 takes place in the usual way, and therefore an illustration of corresponding components of this fuel supply has been dispensed with here.

The power plant 1 comprises, moreover, a recuperator 11 which is assigned to the turbo group 2 and which, on the one hand, is arranged in a second flow path 12 which transports the gases emerging at an outlet 13 of the turbine 3 away from the turbine 3 and delivers them downstream of the recuperator 11, at 14, for example to an exhaust-gas purification device or the surroundings.

Moreover, on the other hand, the recuperator 11 is arranged in the first flow path 15, via which an inlet 16 of the additional turbine 4 is supplied with gas. The first flow path 15 in this case connects the additional turbine 4 to the gas store 17 via the recuperator 11. The recuperator 11 operates as a heat exchanger, and, during normal operation, it extracts heat from the gas originating from the turbine 3 and delivers this heat to the gas intended for the additional turbine 4. In order to increase the energy level in the recuperator 11, the recuperator 11 has arranged in it an additional burner 18, by means of which the temperature of the gas originating from the turbine 3 can be increased. By means of the recuperator 11, the temperature of the gas delivered to the additional turbine 4 consequently also rises. Here, too, a fuel supply for the additional burner 18 is not illustrated for the sake of clarity.

According to the invention, the power plant 1 possesses, moreover, an auxiliary burner 19 which is arranged outside the flow paths 8, 12, 15 of the turbo group 2. The auxiliary burner 19 is connected on the outlet side to the second flow path 12, upstream of the recuperator 11, via a delivery line 20. The auxiliary burner 19 is connected on the inlet side to the outlet side of an auxiliary blower or auxiliary compressor 21, the inlet side of which is connected, for example, to surroundings 23 via a line 22.

A first bypass line 24 connects the first flow path 15, downstream of the recuperator 11, to the second flow path 12, upstream of the recuperator 11. A second bypass line 25 connects the first flow path 15, downstream of the recuperator 11, to the internal flow path 18, upstream of the main burner 5. The bypass lines 24 and 25 can be activated and deactivated with the aid of control valves 26, 27, 28 and 29.

The power plant 1 according to the invention operates as follows:

During normal operation, the valves 26 and 28 are blocked, while the valves 27 and 29 are open. In the recuperator 11, the gas provided to the turbo group 2 is heated before it is introduced into the additional turbine 4. Here, a first expansion and discharge of energy to the drive shaft 6 takes place. In the main burner 5, the temperature of the gas is increased before the latter is introduced into the turbine 3. In the turbine 3, the gas is expanded, further drive energy for driving the generator 7 being released. The expanded gas is then first heated further in the recuperator 11 by the additional burner 11 and is subsequently cooled by the transmission of heat to the gas delivered from the gas store 17, in order thereby to raise the temperature level of the gas delivered to the additional turbine 4.

To start the power plant 1 shown here, first the main burner 5 and the additional burner 18 are shut down. With the aid of a scavenging operation, the flow paths 8, 12 and the components of the power plant 1 which are arranged in them are scavenged, in order thereby to expel quantities of a combustible fuel/oxidizer mixture which may possibly have accumulated therein. After this scavenging operation, the auxiliary burner 19 is activated, for which purpose the auxiliary blower 21 is also switched on. The auxiliary burner 19 is then operated in such a way that it introduces heated gas into the second flow path 12 via the delivery line 20, while, for the gas delivered to the recuperator 11 in this way, a temperature is set, in particular regulated, which is below a selfignition temperature of the fuel/oxidizer mixture delivered to the main burner 5 for starting the turbo group 2. This ensures that the recuperator 11 and, if appropriate, the entire gas-leading system coupled to it can be heated at most up to this uncritical temperature of the gas delivered by the auxiliary burner 19. During this preheating, the flow also passes through the recuperator 11 along the flow path 15, in order to achieve temperature stratification in the recuperator 11. The gas heated along the flow path 15 in the recuperator 11 is conducted around the turbo group 2 on the flow path 24 and is led on the flow paths 25 and 8 past the additional turbine 4 into the turbine 3 or passes the turbo group 2 before it enters the flow path 12. As soon as the a desired preheating temperature of the recuperator 11 is reached, an attempt is made to ignite the main burner 5 during the starting phase of the turbo group 2. If this ignition attempt fails, the fuel/oxidizer mixture delivered to the main burner 5 is not burnt and passes via the second flow path 12 into the recuperator 11. Since only uncritical temperatures prevail in the latter on account of the preheating according to the invention, there is in this case no selfignition of this fuel/oxidizer mixture in the recuperator 11.

Only after successful ignition of the main burner 5 is the additional burner 18 also started, in order to increase the temperature level of the gas delivered to the turbo group 2.

Preheating of the recuperator 11 with the aid of the additional burner 18 is not possible without risk, since, in this case, the situation cannot be avoided where there occur in the recuperator 11, in particular at the additional burner 18, zones or spots, the temperatures of which are above said selfignition temperature. Also at the auxiliary burner 19, temperatures which are markedly higher than said selfignition temperature may occur within the burner 19. However, since the auxiliary burner 19 is arranged externally according to the invention, on the one hand, the combustible fuel/oxidizer mixture cannot come into contact with the auxiliary burner 19. On the other hand, the temperature of the gas which is delivered via the delivery line 20 to the second flow path 12 or directly to the recuperator 11 can be lowered correspondingly in a relatively simple way by intermixing with cold gas. In particular, such intermixing of the hot gases generated directly by the auxiliary burner 19 with colder gases can be implemented even internally within the auxiliary burner 19, the auxiliary burner 19 then containing a corresponding secondary air supply device. It is likewise possible for cold gases to be mixed into the delivery line 20 only downstream of the auxiliary burner 19, in order to lower the temperature of the gas delivered to the recuperator 11 to the desired value.

Although, in the preferred embodiment described here, the power plant 1 is designed as a gas storage power plant, the power plant according to the invention may, in principle, also be designed as a conventional plant, the turbo group 2 of which then has a compressor drive-connected to the turbine 3. Since the starting behavior of the power plant 1 can be improved by means of the features according to the invention, the invention is particularly suitable for application in a gas storage power plant. For, in a gas storage power plant, according to the fundamental notion of a CAES system, a starting operation occurs relatively frequently, for example daily, in order thereby to serve the peak loads of current demand. An improved, in particular shortened starting behavior is therefore particularly useful in gas storage power plants.

LIST OF REFERENCE SYMBOLS

1 Power plant
2 Turbo group
3 Turbine/gas turbine
4 Additional turbine/air turbine
5 Main burner
6 Drive shaft
7 Generator
8 Internal flow path
9 Outlet of 4
10 Inlet of 3
11 Recuperator
12 Second flow path
13 Outlet of 3
14 Exhaust-gas purification device or surroundings
15 First flow path
16 Inlet of 4
17 Gas store
18 Additional burner
19 Auxiliary burner
20 Delivery line
21 Auxiliary blower/auxiliary compressor
22 Line
23 Surroundings
24 First bypass line
25 Second bypass line
26 Valve
27 Valve
28 Valve
29 Valve

What is claimed is:

1. A power plant, with at least one turbo group which has at least one turbine and at least one main burner arranged upstream of the turbine, with at least one recuperator which is arranged, on the one hand, in a first flow path leading gas toward the turbo group and, on the other hand, in a second flow path leading the gas away from the turbo group, with at least one auxiliary burner which is arranged outside the second flow path and the outlet of the auxiliary burner is connected at or upstream of the recuperator, to the second flow path.

2. The power plant as claimed in claim 1, wherein, to supply the auxiliary burner with gas to be heated, an auxiliary blower or auxiliary compressor is arranged upstream of the auxiliary burner.

3. The power plant as claimed in claim 1, wherein the power plant is designed as a gas storage power plant, the first flow path being connected, upstream of the recuperator, to a gas store.

4. The power plant as claimed in claim 3, wherein the turbo group has at least one additional turbine which is arranged upstream of the main burner.

5. The power plant as claimed in claim 4, wherein the turbine is drive-connected to the additional turbine.

6. A method for starting a power plant wherein said power plant comprises at least one turbo group which has at least one turbine and at least one main burner arranged upstream of the turbine, at least one recuperator which is arranged, on the one hand, in a first flow path leading gas toward the turbo group and, on the other hand, in a second flow path leading the gas away from the turbo group, and at least one auxiliary burner which is arranged outside the second flow path and which is connected on the outlet side, at or upstream of the recuperator, to the second flow path, said method comprising:

operating the auxiliary burner to generate heated gas, by means of which the recuperator is preheated before the turbo group is started.

7. The method as claimed in claim 6, wherein, during preheating, the flow also passes through the recuperator along the flow path which, during normal operation, leads the gas to be heated out of a gas store.

8. The method as claimed in claim 6, wherein, before the starting of the turbo group, the recuperator is preheated to a temperature which is below a selfignition temperature of a fuel/oxidizer mixture delivered to the main burner during the starting of the turbo group.

9. The method as claimed in claim 6, wherein, for the heated gas generated by the auxiliary burner, a temperature is set which is below a selfignition temperature of a fuel/oxidizer mixture delivered to the main burner during the starting of the turbo group.

10. The method as claimed in claim 9, wherein the temperature of the heated gas is set in that cooler gas is admixed with a hot gas which is generated by the auxiliary burner and the temperature of which is above said selfignition temperature, before the gas mixture thus formed is fed into the second flow path.

11. The method as claimed in claim 10, wherein the admixing takes place even internally within the auxiliary burner.

* * * * *